Nov. 5, 1935.      H. M. STOLLER ET AL      2,019,638
CLUTCH AND BRAKE MECHANISM
Filed July 21, 1933      3 Sheets-Sheet 1
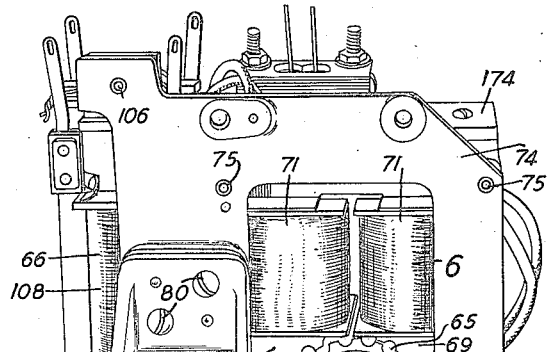
INVENTORS: H. M. STOLLER
E. R. MORTON
BY J. MacDonald
ATTORNEY

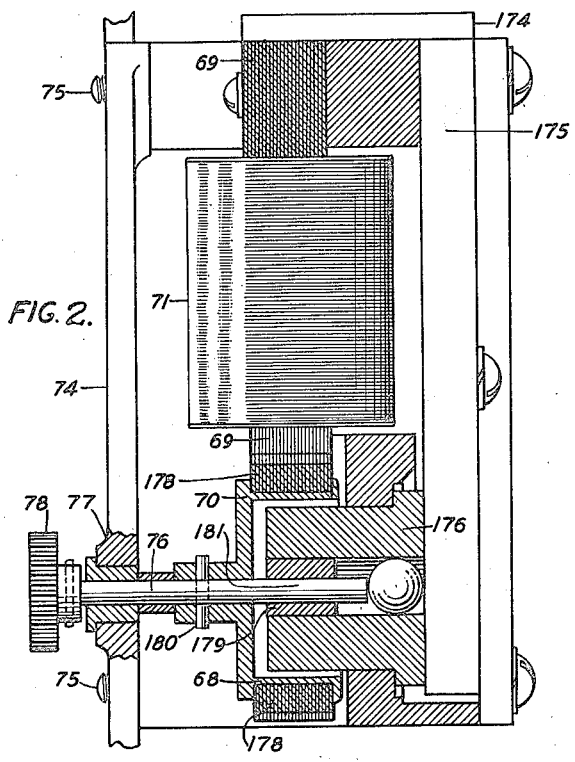
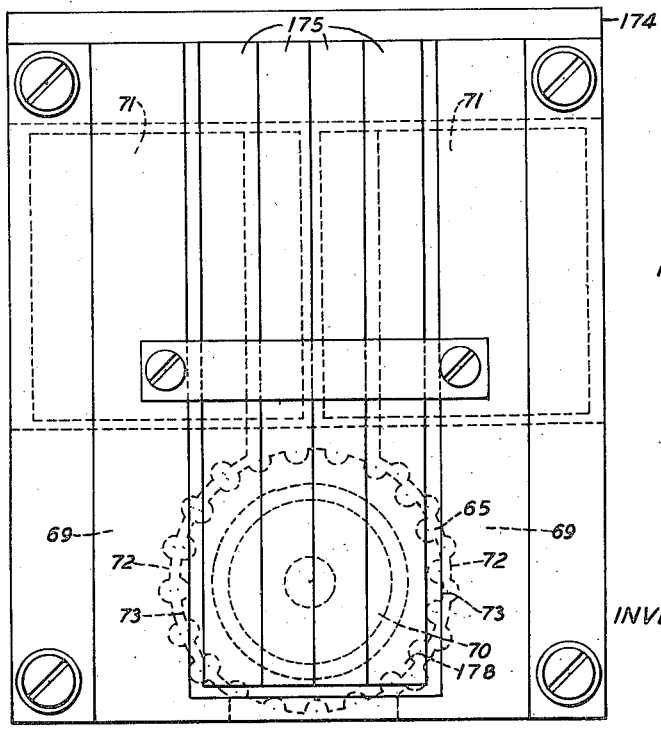

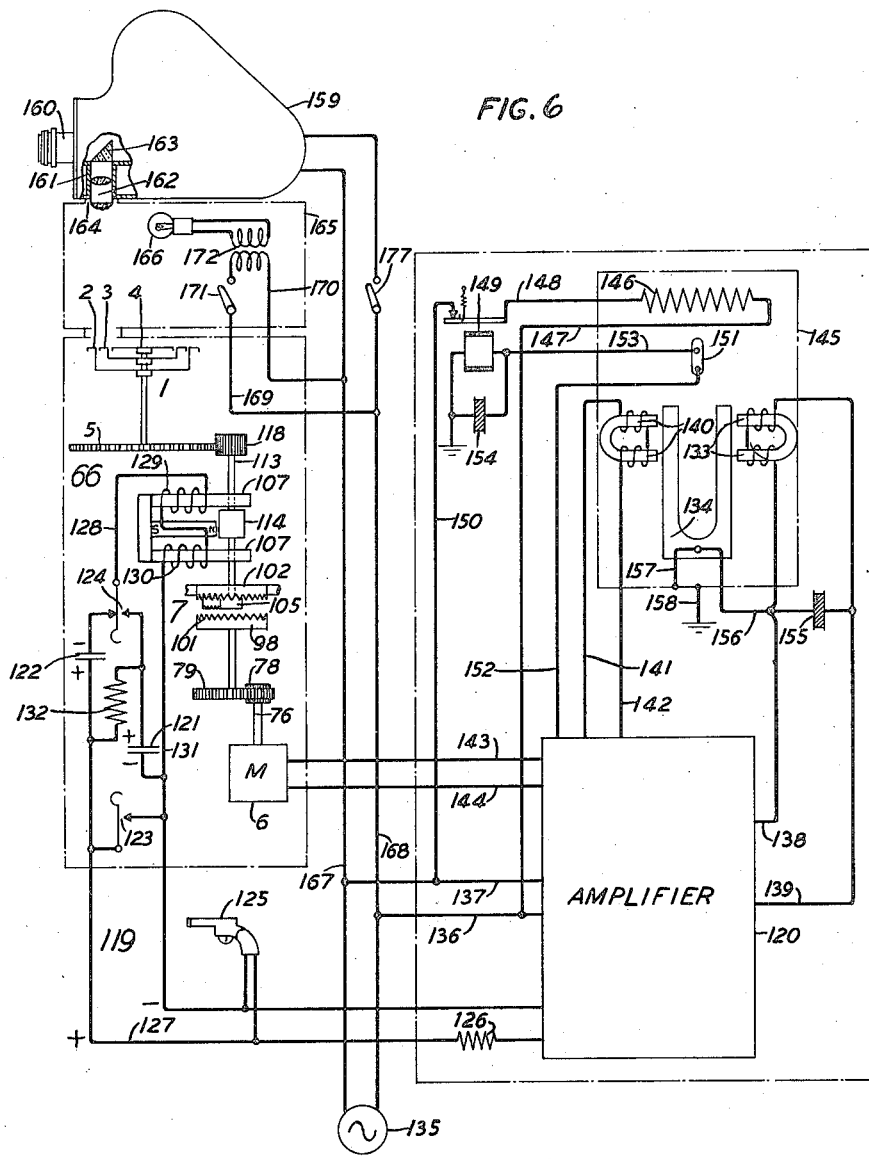

Patented Nov. 5, 1935

2,019,638

UNITED STATES PATENT OFFICE 2,019,638

CLUTCH AND BRAKE MECHANISM

Hugh M. Stoller, Mountain Lakes, N. J., and Edmund R. Morton, New York, N. Y., assignors to Bell Telephone Laboratories, Incorporated, New York, N. Y., a corporation of New York Application July 21, 1933, Serial No. 681,460

4 Claims. (Cl. 192—18)

This invention relates to timing devices and more particularly to a timing device for indicating elapsed time for an event or the time taken by a moving object in traveling from one predetermined point to another. The invention while not necessarily limited to such use is particularly adapted for timing races or other sports events. Certain features which are subsequently described and which constitute this invention are improvements over the timing device disclosed in G. T. Kirby application Serial No. 620,437.

The object of this invention, therefore, is to provide improved means for accurately determining the time taken for a race or other event.

The improvements constituting this invention reside in a clutch for connecting a motor to a device to be driven thereby, the motor and clutch being combined with a polarized clutch operating magnet in a unitary structure. A synchronous motor adaptable for use in connection with the clutch covered in this case is disclosed and claimed in our divisional application Serial No. 41,518, filed September 21, 1935.

A feature of this invention resides in a reciprocating flyer arm and means cooperating therewith in the clutch which insures in one position positive and instantaneous coupling of the motor to a chronometer, and in another position positive and instantaneous stopping of the chronometer.

This invention may be used in conjunction with a chronometer which is combined with a motion picture camera when it is desired to have pictures of an event and a record of the elapsed time appear on the same motion picture film, or it may be used with a chronometer exclusive of the camera when only time records are required.

In the drawings,

Fig. 1 is a view in perspective of the synchronous motor;

Fig. 2 is a side elevational view of the synchronous motor, partly in section;

Fig. 3 is an elevational view of the back of the synchronous motor;

Fig. 4 is a view in perspective of the clutch including the polarized clutch operating magnet;

Fig. 5 is a view in section of a fragmentary portion of the clutch; and

Fig. 6 is a schematic view of the complete timing apparatus.

In timing races and other events with this apparatus the synchronous motor is started some time before the beginning of the event. A starting signal is then given to start the event. When the starting signal is given the clutch is operated to connect the synchronous motor to the chronometer. The chronometer is continued in operation from the beginning of the event until a contestant or a predetermined number of contestants have crossed a certain line. Some time before this predetermined line is crossed by a contestant or contestants, lamps to illuminate the dials of the chronometer are lighted and the motion picture camera is brought into operation. Pictures are then taken of the event and the chronometer dials. In each frame of the motion picture film, therefore, there appears an image of the contestant or contestants as the line is approached or crossed and a picture of the chronometer dials showing them in their relative positions with respect to some predetermined point at the time the picture was taken.

To more clearly point out the improvements in which this invention resides reference will now be had to the drawings.

The chronometer is driven by means of a synchronous motor 6 which is combined with the clutch 7 and the polarized clutch operating magnet 66 in a unitary structure as shown in Figs. 1 and 4. The synchronous motor 6 is a nonself-starting synchronous motor and comprises a set of U-shaped laminated pole-pieces 69, a set of permanent magnets 175, shown in Figs. 2 and 3, a cylindrical rotor 70 and a pair of operating coils 71 to alternate the magnetism of the pole-pieces 69. The free ends of the pole-pieces 69 are machined out at their adjacent inward faces to provide a cylindrical aperture 65 to accommodate the rotor 70. The pole-pieces 69 are provided with arcuately arranged protuberances 72 which project into the magnetic field. Operating within the cylindrical aperture 65 formed between the free ends of the pole-pieces 69 is the cylindrical rotor 70 which has peripheral projections 73 extending radially toward the protuberances 72 of the pole-pieces 69. The number and spacing of the protuberances 72 of the pole-pieces 69 and the number and spacing of the peripheral projections 73 on the rotor 70 are so arranged that when the peripheral projections 73 on one side of the rotor 70 are in alignment with the inwardly projecting protuberances 72 of one pole-piece, the peripheral projections 73 on the other side of the rotor 70 are not in alignment with the inwardly projecting protuberances 72 of the other pole-piece. Connected to the closed end of the laminated pole-pieces 69 by means of a plate 174 is a set of bar magnets 175 which are permanently magnetized. The bar magnets 175 are arranged in parallel and extend parallel to the leg portions of the laminated pole-pieces 69. The south poles of the bar magnets 175 terminate in the plate 174 and the north poles of the bar magnets extend downward toward the free ends of the laminated pole-pieces 69. Attached to the north pole ends of the bar magnets 175 is a plug member 176 of magnetic material. The cylindrical rotor 70 comprises a brass cup member 68 on the periphery of which is secured a ring 178 of magnetic material. On the periphery of the ring 178 are the projections 73 which extend radially of the rotor 70 toward the pole-pieces 69. The plug 176 is provided with a centrally located sleeve bearing 179 adapted to receive a shaft 76 which is secured at 180 to the bottom of the brass cup member 68. The shaft 76 extends inward within the center of the brass cup member 68 to form a pin portion 181 which is journaled in the sleeve bearing 179 of the plug 176. The shaft 76 projects beyond the bottom of the brass cup member 68. The magnetic circuit for the motor may be traced from the north pole ends of the magnets, through the plug 176 the peripheral projections 73 of the ring 178, through the pole-pieces 69 by way of the protuberances 72, thence through the plate 174 to the south pole ends of the bar magnets 175. The motor 6 is secured to a rectangular frame 74 as shown in Fig. 1 by means of the screws 75. The shaft 76 is journaled in a boss 77 of the frame 74 and extends outward beyond the flat surface of the frame. Secured to the outer extremity of the shaft 76 is a pinion 78 the teeth of which engage a comparatively large gear 79 which, as will be subsequently described, serves to drive a clutch member.

Secured to the outer flat face of the rectangular frame 74 by means of the screws 80 is an L-shaped bracket 81 which terminates at its free end in spaced bosses 82 and 83. Secured within the boss 82 and extending inwardly therefrom toward the flat face of the frame 74 is a pin 84 on which is revolubly supported the comparatively large gear 79 which is permanently engaged by the pinion 78. Secured to the outer face of the large gear 79 by means of the pins 85 is a ratchet wheel 86. The ratchet wheel 86 serves in conjunction with other means to be subsequently described, to provide a means for manually rotating the cylindrical rotor 70 of the motor 6.

The frame 74 terminates in one end in a plate portion 87 shown in Fig. 1 as being integral with the frame 74. The plate portion 87 is provided with an elongated arcuately shaped aperture 88 and an elongated straight aperture 89. Journaled in a boss 90 in the plate portion 87 and projecting normal to the plane of the plate portion 87 is a shaft 91. Attached to the outer end of the shaft 91 is a handle 92 which may be manually operated to rotate the shaft 91 when the synchronous motor 6 is to be started. Attached to the center of the shaft 91 and projecting normal to the axis of the shaft 91 is an L-shaped arm 93 the free end of which projects through the elongated arcuately shaped aperture 88 in the plate portion 87. The arm 93 is manually operated by means of the handle 92 against the action of a spring 94, the spring 94 being attached at one end to the arm 93 and having the other end attached to a screw 95 which is adjustable within the elongated straight aperture 89 in the plate portion 87 of the frame 74. Attached to the arm 93 and extending normal therefrom is a pawl 96, a free end of which may be brought into engagement with the ratchet wheel 86. To start the synchronous motor 6 the handle 92 is manually moved toward the right until the free end of the arm 93 reaches the end of the elongated arcuately shaped aperture 88. By this movement the pawl 96 is brought into engagement with the ratchet wheel 86. When the handle 92 is released the spring 94 returns the arm 93 to normal position and in doing so presses the pawl 96 against the teeth of the ratchet wheel 86. The ratchet wheel 86 is therefore driven by the spring-operated pawl 96 until the pawl 96 passes in its arc of movement out of engagement with the ratchet wheel 86. Since the ratchet wheel 86 is pinned to the large gear 79, rotation of the ratchet wheel 86 causes rotation of the large gear 79 and rotation of the pinion 78 which is attached to the shaft 76 extending axially from the cylindrical rotor 70 of the synchronous motor 6. When the synchronous motor 6 has been thus manually started the rotor 70 is continued in its rotation by means of the operating coils 71.

Adjustably secured within the boss 83 of the L-shaped bracket 81 is a screw 97 which serves as an adjustable bearing for a shaft 182. The shaft 182 extends through an aperture in the frame 74 and runs parallel with an arm 109 which is integral with the frame 74. The arm 109 extends backward of the frame 74 and terminates at its free end in an upturned end portion 110. The upturned end portion 110 supports a bearing 111, an adjustment screw 183 and a set screw 184. The shaft 182 is supported at one end by the screw 97 and at the other end by the bearing 111 and may be adjusted longitudinally by means of the screws 97 and 183.

Between the free end of the L-shaped bracket 81 and the frame 74 and supported by the shaft 182 is an annular clutch member 98. The annular clutch member 98 is provided with peripheral teeth 99 forming a gear which is in engagement with the teeth of the large gear 79. The clutch member 98 has a hub portion 100 which is pinned to the shaft 182. The clutch member 98 is provided with clutch teeth on its inner face 101, the teeth being directed axially toward the rectangular frame 74 and having their edges radial with respect to the shaft 182. An annular stop clutch member 102 with teeth corresponding in number and spacing to the teeth on the inner face 101 of the clutch member 98 is secured to the rectangular frame 74 by means of the screws 103. The teeth on the annular stop clutch member 102 extend axially toward the clutch member 98 and have their edges radial to the shaft 182 and are inclined conjugately to the teeth on the inner face 101 of the annular clutch member 98. The annular clutch member 98 and the stop clutch member 102 are spaced apart a sufficient distance to permit a flyer arm clutch member 105 to be operated between them. The flyer arm clutch member 105 is attached to an annular hub 185 which forms one end of a tubular shaft 113. The tubular shaft 113 extends parallel to the arm 109 and encloses the shaft 182 and is provided with internal bearing surfaces in each end. The shaft 182 is normally rotated within the tubular shaft 113 and the tubular shaft 113 may be moved longitudinally along the shaft 182. The flyer arm clutch member 105 is moved from one to the other of the clutch members 98 and 102 by means of the polarized clutch operating magnet 66. The polarized clutch operating magnet 66 is attached to the rectangular frame 74 by means of a bracket 106 and has spaced pole-pieces 107, a permanent bar magnet 186 and operating coils 108 extending parallel to the rectangular frame 74. The tubular shaft 113 extends through bifurcated ends in the pole-pieces 107 and through the center of the annular stop clutch member 102. Between the pole-pieces 107 and attached to the shaft 113 is a cylindrical armature 114 which is attracted toward one or the other of the pole-pieces 107 when the polarized clutch operating magnet 66 is operated. The tubular shaft 113, therefore, is longitudinally moved by operation of the polarized clutch operating magnet 66.

Attached to an end of the tubular shaft 113 and disposed between the stop clutch member 102 and the annular clutch member 98 is the flyer arm 105. The flyer arm 105 extends normal to the axis of the tubular shaft 113 and has teeth 115 on opposite faces of its free end. The teeth 115 project in a direction conjugate with the teeth on the adjacent clutch members 102 and 98. The teeth, for instance, on the left-hand side of the flyer arm 105 are adapted to mesh with the teeth on the inner face of the stop clutch member 102 and the teeth on the right-hand side of the flyer arm 105 are adapted to mesh with the teeth on the inner face 101 of the annular clutch member 98. The teeth 115 on the flyer arm 105, are however, finer than the teeth on the clutch members 98 and 102. Preferably there should be on each face of the flyer arm 105 twice the number of teeth per unit of space as on the adjacent faces of the clutch members 98 and 102. When the polarized clutch operating magnet 66 is operated to move the tubular shaft 113 toward the right the teeth 115 on the right-hand side of the flyer arm 105 are brought into engagement with the teeth on the inner face 101 of the annular clutch member 98 and since this clutch member 98 is continuously driven by means of the large gear 79, the tubular shaft 113 is rotated. When the polarized clutch operating magnet 66 is operated to move the tubular shaft 113 toward the left the flyer arm 105 is disconnected from the rotating clutch member 98 and is moved over so that the teeth 115 on the left-hand side are brought into engagement with the stop clutch member 102. Since the stop clutch member 102 is secured to the rectangular frame 74 further rotation of the tubular shaft 113 is prevented.

By using a polarized clutch operating magnet 66 for operation of the clutch 7, bouncing of the teeth 115 of the flyer arm 105 over the adjacent teeth of either the annular clutch member 98 or the stop clutch member 102 is prevented. Even though the polarized clutch operating magnet 66 is only momentarily energized for each operation, the armature 114 is held in its last moved position by the magnetic flux in the smaller air gap between the armature 114 and the adjacent pole face and the teeth 115 of the flyer arm 105 are maintained in mesh with the adjacent teeth of the annular clutch member 98 or the stop clutch member 102, whichever one is last engaged by the flyer arm 105. Comparatively fine teeth 115 are provided on the flyer arm 105 to reduce the percentage of error in the mechanism due to lost motion while the teeth are being moved into engagement in the clutch changing operation. With twice the number of teeth per unit of space on each side of the flyer arm 105 as on the adjacent faces of the stop clutch member 102 and the annular clutch member 98 the flyer arm 105 or the annular clutch member 98, whichever happens to be rotating at the time, has to move only half the space of one of the large teeth before operative engagement occurs. While it is obvious that the same degree of accuracy could be obtained by making all of the cooperating clutch teeth small, some economy in the machining of parts is obtained by cutting the small teeth only on the flyer arm 105. The space between the stop clutch member 102 and the annular clutch member 98 is made less than the difference between the spacing of the pole-pieces 107 and the length of the cylindrical armature 114 to prevent frictional engagement of the armature 114 with a pole-piece when the polarized clutch operating magnet 66 is operated to engage the flyer arm 105 with the rotating clutch member 98. The pole-pieces 107 of the polarized clutch operating magnet 66 have bifurcated free ends which engage the reduced ends 116 of a block member 117 of non-magnetic material which is secured to the arm 109 and which serves as a steadying rest for the lower end of the polarized clutch operating magnet 66.

Attached to the tubular shaft 113 at the end opposite to that occupied by the flyer arm 105, as shown in Figs. 4, 5 and 6, is a comparatively wide pinion 118 which engages the comparatively thin skeleton gear 5 of the chronometer 1. Since the pinion 118 is made much wider than the skeleton gear 5 the pinion 118 and the skeleton gear 5 remain in mesh even though the tubular shaft 113 is moved longitudinally upon operation of the polarized clutch operating magnet 66.

To provide quick acting and positively operating means for operating the clutch upon a momentary closure of a pair of contacts the polarized clutch operating magnet 66 is employed. The polarized clutch operating magnet 66 as shown in Fig. 6 is included in a start signal control circuit 119. The start signal control circuit 119 is connected to a portion of an amplifier 120 and contains a pair of condensers 121 and 122, the start key 123 and the stop key 124. The portion of the amplifier 120 to which the start signal control circuit 119 is connected supplies direct current potential to charge the condensers 121 and 122. The polarized clutch operating magnet 66 is operated by discharge current from the condenser 121 or 122 when one of the keys 123 or 124 is operated or when contacts are closed in a starting pistol 125.

The condensers 121 and 122 are normally maintained in a charged condition but are limited to a comparatively slow rate of charging by means of the resistance 126. The resistance 126 also prevents the amplifier 120 from being affected by discharge current from the condensers 121 and 122. The start signal control circuit 119 is normally as follows: From the amplifier 120, comparatively high value resistance 126, conductor 127, condenser 122, left-hand contacts of stop key 124, conductor 128, upper winding 129 of polarized clutch operating magnet 66, lower winding 130 of polarized clutch operating magnet 66, conductor 131 to the amplifier 120. In shunt across the conductors 127 and 131 and in parallel with the start key 123 and the stop key 124 is a resistance 132 and the condenser 121. In this circuit positive potential is normally applied to the windings of the polarized clutch operating magnet 66 by way of the comparatively high value resistance 126, conductor 127, condenser 122, left-hand contacts of stop key 124 and conductor 128. Positive potential is also supplied to the condenser 121 by way of the resistance 132. Since the condensers 122 and 121 are only brought to a charged condition in a comparatively slow manner by reason of the comparatively high value resistance 126 and since no sudden increase or sudden change in potential is applied to the windings of the polarized clutch operating magnet 66, the armature 114 of the polarized clutch operating magnet 66 remains in its last operated position which, merely for the purpose of illustration, will be assumed to be toward the upper pole piece 107. Under this condition, the flyer arm 105 of the clutch 7 is held against the stop clutch member 102 which, as shown in Fig. 4, is attached to the frame 74. When the start key 123 is manually operated the contacts in the key are momentarily closed. The condenser 122 then discharges current by way of the conductor 127 and the closed contacts of the start key 123 and applies a sudden positive potential to the windings of the polarized clutch operating magnet. This causes a magneto motive force in the pole pieces 107 of the clutch operating magnet 66, the magneto motive force applied aiding the magneto motive force, due to the permanent polarizing magnet, in one pole and opposing the magneto motive force, due to the permanent polarizing magnet, in the other pole. This increases the flux in the larger air gap and reduces the flux in the smaller air gap or may even produce magnetic polarities across the smaller air gap to produce a repelling force between these adjacent pole faces. The armature 114 of the polarized clutch operating magnet 66 is therefore moved over toward the lower pole piece of the polarized clutch operating magnet 66 and the clutch flyer arm 105 is moved into engagement with the annular rotating clutch member 98. In this movement of the armature 114 of the polarized clutch operating magnet 66, the shaft 113 moves the comparatively wide pinion 118 across the rim of the master gear 5. This pinion 118, however, is of sufficient width to remain in engagement with the master gear 5 of the chronometer 1. When the clutch flyer arm 105 is brought into engagement with the annular rotating clutch member 98 the shaft 113 is rotated and the chronometer 1 is set in operation. Upon release of the start key 123 the contacts of the key immediately open and the discharge circuit for the condenser 122 is broken. The condenser 122 then begins to charge up again but is limited to a comparatively slow charging process by reason of the comparatively high value resistance 126. The comparatively high value resistance 126 in addition to limiting the condenser 122 to a slow charging process also prevents either the charging or discharging of the condenser 122 from affecting the amplifier 120. Since the amplifier 120, as will be subsequently explained, is also utilized in supplying energy to the driving coils 133 of the tuning fork 134 which is employed in connection with the supply of current to the synchronous motor 6 which drives the chronometer 1, it is important that the amplifier be protected from any effects which might cause its unbalance.

Instead of operating the start key 123 as above described to cause operation of the polarized clutch operating magnet 66 and the connecting of the synchronous motor 6 by way of the clutch 7 to the chronometer 1 it may be desirable to control the starting of the chronometer 1 by means of a starting signal which will give an audible signal for the starting of an event. The starting signal for a race or other sports event is often given by the firing of a pistol. A starting pistol 125 therefore is shown as being connected across the conductors 127 and 131. Contacts in the starting pistol 125 are preferably momentarily closed and opened simultaneously with the firing of the pistol. For instance, contacts in the pistol 125 may be closed when the cartridge is struck by the hammer of the pistol and opened again on the slight rebound of the hammer. It is common practice in small firearm constructions to have the hammer strike the cartridge on a slight overthrow movement and then move back to normal fired position. The contacts of the pistol therefore may close when the hammer is in the overthrow position and open again when it moves back to the normal position immediately after striking the cartridge. The condenser 122 would then discharge on the instant the cartridge was struck by the hammer and the impulse from the condenser would proceed by way of the conductor 127, thence through the closed contacts of the pistol 125 and through the conductor 131 to the windings of the polarized clutch operating magnet 66.

To stop the chronometer 1 the stop key 124 is manually operated to close its contacts. This, like the operation of the start key 123 or the firing of the pistol 125 is a momentary closure of the contacts and provides for a condenser discharge to operate the polarized clutch operating magnet 66. When the stop key 124 is manually operated to close its right-hand contacts the condenser 121 discharges by way of the right-hand contacts in the stop key 124, conductor 128, and windings 129 and 130 of the polarized clutch operating magnet 66. This increases the flux in the upper pole piece 107 and decreases the flux in the lower pole piece 107 of the polarized clutch operating magnet 66 sufficient to attract the armature 114 toward the upper pole piece 107 of the polarized clutch operating magnet 66. The clutch flyer arm 105 would then be moved out of engagement with the annular rotating clutch member 98 and into engagement with the stop clutch member 102. Since the polarized clutch operating magnet 66 is operated on comparatively high potential condenser discharge current and these surges of current are of extremely short duration, there is no pronounced heating of the windings of the polarized clutch operating magnet 66, such, for instance, as would occur if the start signal control circuit had been closed for a comparatively long period to cause operation of the clutch operating magnet.

In Fig. 6 a tuning fork 134 and an amplifier 120 are shown as included in the system. Since the amplifier employed in this invention may be of standard and well known design, details of the amplifier are not shown in the schematic view. The amplifier 120, however, is supplied with operating current from an alternating current generator 135 over the conductors 167, 168, 136 and 137. From the output of amplifier 120 current is supplied by way of conductors 138 and 139 to the driving coils 133 of the tuning fork 134. The pick-up coils 140 of the tuning fork 134 are connected by the conductors 141 and 142 to an input connection of the amplifier 120 so that currents of controlled frequency developed in the pick-up coils 140 of the tuning fork 134 may be amplified to operate the synchronous motor 6. From an output connection of the amplifier 120 amplified current of controlled frequency is supplied over the conductors 143 and 144 to the synchronous motor 6. Since the timing apparatus of this invention must be extremely accurate and faithful in its performance under varying climatic conditions the tuning fork is enclosed in a casing 145 in which the temperature is maintained constant by means of a thermostatically controlled heating element 146. The circuit for the heating element 146 may be traced as follows: Alternating current generator 135, conductor 168, conductor 136, conductor 147, heating element 146, conductor 148, back contact and armature of relay 149, conductor 150, conductor 137, conductor 167 to the alternating current generator 135. Relay 149 is controlled in its operation by means of a thermostat 151. The thermostat 151 may, for instance, be a mercury thermometer placed preferably in close proximity to the tuning fork 134 and within the casing 145. The circuit including the thermostat 151 and the relay 149 may be traced as follows: From an outlet connection of the amplifier 120, conductor 152, thermostat 151, conductor 153, winding of relay 149 to ground. In shunt of the winding of relay 149 is a resistance element 154 which will protect the relay 149 from the effects of comparatively high potentials. This resistance element 154 may be, for instance, a block of thyrite since thyrite has the characteristic of decreasing in resistance with an increase in potential applied. When the temperature within the casing 145 reaches a predetermined value, the thermostat 151 operates to close the circuit of relay 149. Relay 149 then operates and pulls its armature away from the back contact and breaks the circuit to the heating element 146. When the temperature within the casing 145 drops below a predetermined value thermostat 151 opens the circuit of relay 149. Relay 149 is then deenergized and its armature is permitted to return to the back contact and close the circuit of the heating element 146.

To protect the tuning fork 134 from the unbalancing effects of comparatively high potentials which might be applied to the driving coils 133 a resistance device 155 is shunted across the conductors 138 and 139 in parallel with the driving coils 133 of the tuning fork 134. This resistance device 155 may be for instance a block of thyrite which has the characteristic above described. The resistatnce device 155 is connected to the tuning fork 134 by means of the conductor 156 and to the casing 145 by means of the conductor 157. Since the casing 145 is grounded at 158 a path is supplied to ground by way of the resistance device 155 for comparatively high potentials which might be applied to the circuit of the driving coils 133 of the tuning fork 134.

When the timing apparatus above described is to be used in conjunction with a motion picture camera, a motion picture camera equipped with two lenses and of the type described in the above identified G. T. Kirby application is provided. The motion picture camera may be of standard construction and modified by having a lens system added to it for viewing the dials of the chronometer 1 or the lens system for viewing the dials of the chronometer 1 may be permanently built into the camera construction. In Fig. 6 a motion picture camera 159 has been included. The motion picture camera 159 is provided with the usual lens system 160 for projecting images onto a motion picture film within the camera. Extending from the lens system 160 of the motion picture camera 159 is a lens system 161 for viewing the dials 2, 3 and 4 of the chronometer 1. The lens system 161 comprises a light passage 162 which is in communication with the lens system 160 and the dials of the chronometer 1. Included in the lens system 161 and located within the lens system 160 of the camera is a prism 163 which will project an image of the dials into the view line of the camera 159 within the lens system 160. In alignment with the lens system 161 is an aperture 164 in the casing 165. Supported within the casing 165 and not in alignment with the aperture 164 is a lamp 166 which serves to throw light on the dials 2, 3 and 4 of the chronometer 1. The lamp 166 is supplied with current from the source of alternating current 135 by way of the conductors 167, 168, 169, 170, switch 171, and transformer 172.

The motion picture camera 159 may be driven by a spring motor such as is common in motion picture camera constructions or it may be driven by an electric motor. In the preferred embodiment, as shown in Fig. 6, the camera 159 is electrically driven, the motor for the camera being supplied with current from the source of alternating current 135 over the conductors 167 and 168 and switch 177.

Assuming that the apparatus above described is to be used in timing a sporting event such, for instance, as a race and that the amplifier 120 and heating element 146 are connected to the source of alternating current 135 the operation is as follows: A starting signal for the event is given. Simultaneously with the giving of the starting signal contacts are closed and then immediately opened in either the pistol 125 or in the start key 123. With the closing of the contacts at either of these points, condenser 122 discharges and increases the flux in the lower pole piece 107 and decreases the flux in the upper pole piece 107 of the polarized clutch operating magnet 66. The armature 114 is then moved downward toward the lower pole piece 107 of the polarized clutch operating magnet 66. The shaft 113 is moved longitudinally and the clutch flyer arm 105 is moved out of engagement with the stop clutch member 102 and into engagement with the annular clutch member 98. Since the annular clutch member 98 is being driven by the synchronous motor 6 and since the shaft 113 is connected by means of the pinion 118 to the master gear 5 of the chronometer 1; the dials 2, 3 and 4 of the chronometer 1 are set in rotation. The armature 114 of the polarized clutch operating magnet 66 will be maintained in the last operated position by the magnetism in the lower pole piece 107 until the polarized clutch operating magnet 66 is operated again. The clutch flyer arm 105 also will be held in engagement with the annular clutch member 98 by reason of the magnetic pull in the lower pole piece 107 of the polarized clutch operating magnet 66. The chronometer 1 will continue to operate until the stop key 124 is manually operated to close the right hand contacts of the key. When a contestant crosses the finish line the stop key 124 is operated to close its right hand contacts. The condenser 121 will then discharge and cause increase of flux in the upper pole piece 107 and decrease of flux in the lower pole piece 107 of the polarized clutch operating magnet 66. The armature 114 will then be moved toward the upper pole piece 107. The shaft 113 will be moved upward longitudinally and will carry the clutch flyer arm 105 out of engagement with the annular clutch member 98 and into engagement with the stop clutch member 102. Since the stop clutch member 102 is secured to the frame 74 the chronometer 1 will be immediately stopped. The elapsed time for the event can then be read from the dials 2, 3 and 4 as they stand relative to a fixed point.

If the motion picture camera 159 is being used in conjunction with the chronometer 1 to time the event, the stop key 124 would not be manually operated until the event was all finished or until a predetermined number of contestants had crossed the finish line. When the camera 159 is to be used, camera 159 is set in operation by closing the switch 177 as the contestants approach the finish line. Prior to the closing of the switch 177 the switch 171 is operated to close the circuit to the lamp 166. The switch 171 should be closed prior to the bringing into operation of the camera 159 to permit the lamp 166 to reach its full intensity of illumination before pictures are taken of the dials 2, 3 and 4. With the lamp 166 lighted and the camera 159 in operation pictures of the finish of the event are taken together with pictures of the rotating dials 2, 3 and 4 of the chronometer 1. Since each frame of the film of the motion picture camera contains a picture of the event and the dials 2, 3 and 4 of the chronometer 1, the positions of contestants relative to a finish line and the time in which they reach such points can be readily determined.

What is claimed is:

1. In an apparatus of the class described, a clutch comprising a driven rotating clutch member means to drive said clutch member, a fixed stop clutch member spaced from said rotating clutch member, a reciprocating arm operating between said clutch members, a shaft supporting said arm, an armature on said shaft, a support for said shaft and a polarized magnet to move said shaft longitudinally upon said support to bring said arm into engagement with a clutch member, said polarized magnet having spaced pole pieces and said armature being disposed between said pole pieces and rotating with said shaft.

2. In an apparatus of the class described, a clutch comprising a pair of spaced clutch members each having teeth directed toward the other clutch member, an arm operating between said clutch members, said arm having teeth on opposite faces to engage the teeth on said clutch members, the teeth on each face of said arm being greater in number for a unit of space than the teeth of the clutch member adjacent to that face of the arm for the said unit of space, a longitudinally movable shaft supporting said arm, and means to longitudinally move said shaft to bring said arm into engagement with one of said clutch members.

3. In an apparatus of the class described, a clutch comprising a pair of spaced clutch members each having teeth directed toward the other clutch member and which are inclined conjugately to the teeth on the other clutch member, an arm operating between said clutch members, said arm having teeth on opposite faces conjugately inclined toward the teeth on the adjacent clutch member, the teeth on each face of said arm being double the number of teeth for the same unit of space of the adjacent clutch member, a longitudinally movable shaft supporting said arm, and means to longitudinally move said shaft to bring said arm into engagement with one of said clutch members.

4. In an apparatus of the class described, a clutch comprising a frame, a driven shaft journalled in said frame, means to drive said driven shaft, a tubular shaft enclosing a portion of said driven shaft and having spaced bearings engaging said driven shaft, a fixed clutch member attached to said frame, a rotatable clutch member spaced from said fixed clutch member and attached to said driven shaft, each of said clutch members having inclined teeth directed conjugately toward the teeth of the other clutch member, an arm extending radially from said tubular shaft between said clutch members, said arm having inclined teeth on its opposite faces conjugately directed toward the teeth on the said clutch members, a cylindrical armature secured to said tubular shaft, and electromagnetic means associated with said armature to move said tubular shaft longitudinally to bring said arm into engagement with one of said clutch members.

HUGH M. STOLLER.
EDMUND R. MORTON.